(12) United States Patent
Nishimura et al.

(10) Patent No.: US 12,199,420 B2
(45) Date of Patent: Jan. 14, 2025

(54) WIRING MEMBER AND WIRING MEMBER IN PACKAGED FORM

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Motohiro Yokoi, Mie (JP); Kenta Ito, Mie (JP); Haruka Nakano, Mie (JP); Hidetoshi Ishida, Mie (JP); Ryusuke Kudo, Mie (JP); Masaki Mizushita, Mie (JP); Kenta Arai, Mie (JP); Daisuke Ebata, Mie (JP); Yasuyuki Yamamoto, Mie (JP); Suguru Yasuda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 485 days.

(21) Appl. No.: 17/312,241

(22) PCT Filed: Dec. 12, 2019

(86) PCT No.: PCT/JP2019/048636
§ 371 (c)(1),
(2) Date: Jun. 9, 2021

(87) PCT Pub. No.: WO2020/122163
PCT Pub. Date: Jun. 18, 2020

(65) Prior Publication Data
US 2022/0024393 A1    Jan. 27, 2022

(30) Foreign Application Priority Data
Dec. 12, 2018 (WO) .................. PCT/JP2018/045662

(51) Int. Cl.
*H02G 3/30* (2006.01)
*B60R 16/02* (2006.01)
*H01B 13/012* (2006.01)

(52) U.S. Cl.
CPC .......... *H02G 3/30* (2013.01); *B60R 16/0207* (2013.01); *B60R 16/0215* (2013.01); *H01B 13/01209* (2013.01)

(58) Field of Classification Search
None
See application file for complete search history.

(56) References Cited

U.S. PATENT DOCUMENTS

| | | | | |
|---|---|---|---|---|
| 3,819,848 A * | 6/1974 | Fry | ...................... | H02G 3/0487 174/72 A |
| 8,946,551 B2 * | 2/2015 | Hudson | ................ | H01B 7/0045 174/72 A |

(Continued)

FOREIGN PATENT DOCUMENTS

| CN | 1461015 | 12/2003 |
|---|---|---|
| CN | 103813629 | 5/2014 |

(Continued)

OTHER PUBLICATIONS

Japan Office Action issued in Japan Patent Application No. 2020-559602, dated Aug. 30, 2022, together with English translation thereof.

(Continued)

*Primary Examiner* — Krystal Robinson
(74) *Attorney, Agent, or Firm* — Greenblum & Bernstein, P.L.C.

(57) ABSTRACT

A wiring member includes a sheet-shaped member and multiple linear transmission members that are fixed on the (Continued)

sheet-shaped member. The multiple linear transmission members are fixed on the sheet-shaped member such that a portion of the multiple linear transmission members intersects with respect to another said linear transmission member. An intersection location of the multiple linear transmission members is located away from a folding position.

11 Claims, 7 Drawing Sheets

(56) References Cited

U.S. PATENT DOCUMENTS

| | | | |
|---|---|---|---|
| 10,867,721 | B2 | 12/2020 | Ishida et al. |
| 11,837,861 | B2 * | 12/2023 | Ishida ................. B60R 16/0207 |
| 2004/0000424 | A1 | 1/2004 | Mori et al. |
| 2012/0152160 | A1 | 6/2012 | Ysbrand |
| 2013/0292159 | A1 | 11/2013 | Gotou et al. |
| 2014/0131071 | A1 * | 5/2014 | Tanaka ................... H05K 1/028 |
| | | | 174/254 |
| 2015/0279514 | A1 * | 10/2015 | Sato .................... B60R 16/0207 |
| | | | 174/72 A |
| 2019/0392963 | A1 | 12/2019 | Ishida et al. |

FOREIGN PATENT DOCUMENTS

| | | |
|---|---|---|
| DE | 19819088 | 6/2008 |
| JP | 01-107414 | 4/1989 |
| JP | 04-248209 | 9/1992 |
| JP | 2001-301856 | 10/2001 |
| JP | 2002-267852 | 9/2002 |
| JP | 2004328858 A * | 11/2004 |
| JP | 2012-161234 | 8/2012 |
| JP | 2014-202817 | 10/2014 |
| JP | 2015-118731 | 6/2015 |
| JP | 2016-015852 | 1/2016 |
| JP | 2016-081859 | 5/2016 |
| JP | 2017-191719 | 10/2017 |
| JP | 2018-137208 | 8/2018 |
| WO | WO-2019044122 A1 * | 3/2019 ......... B60R 16/0215 |

OTHER PUBLICATIONS

International Search Report issued in International Patent Application No. PCT/JP2018/045662, dated Jan. 22, 2019, along with an English translation thereof.
International Search Report issued in International Patent Application No. PCT/JP2019/048636, dated Mar. 3, 2020, along with an English translation thereof.
U.S. Appl. No. 17/296,666, filed May 25, 2021.
U.S. Appl. No. 17/296,694, filed May 25, 2021.
U.S. Appl. No. 17/311,501, filed Jun. 7, 2021.
China Office Action issued in China Patent Application No. 201980080766.6, dated Mar. 10, 2023, together with English translation thereof.
China Office Action issued in China Patent Application No. 201980080766.6, dated Oct. 18, 2022, together with English translation thereof.
China Office Action issued in China Patent Application No. 201980080766.6, dated Mar. 23, 2022, together with English translation thereof.
Japan Office Action issued in Japan Patent Application No. 2020-559602, dated Apr. 5, 2022, together with English translation thereof.
China Office Action issued in China Patent Application No. 201980080766.6, dated Jul. 18, 2023, together with English translation thereof.
German Office Action issued in German Patent Application No. 11 2019 006 205.0, dated May 28, 2024, together with English translation thereof.

* cited by examiner

F I G. 5
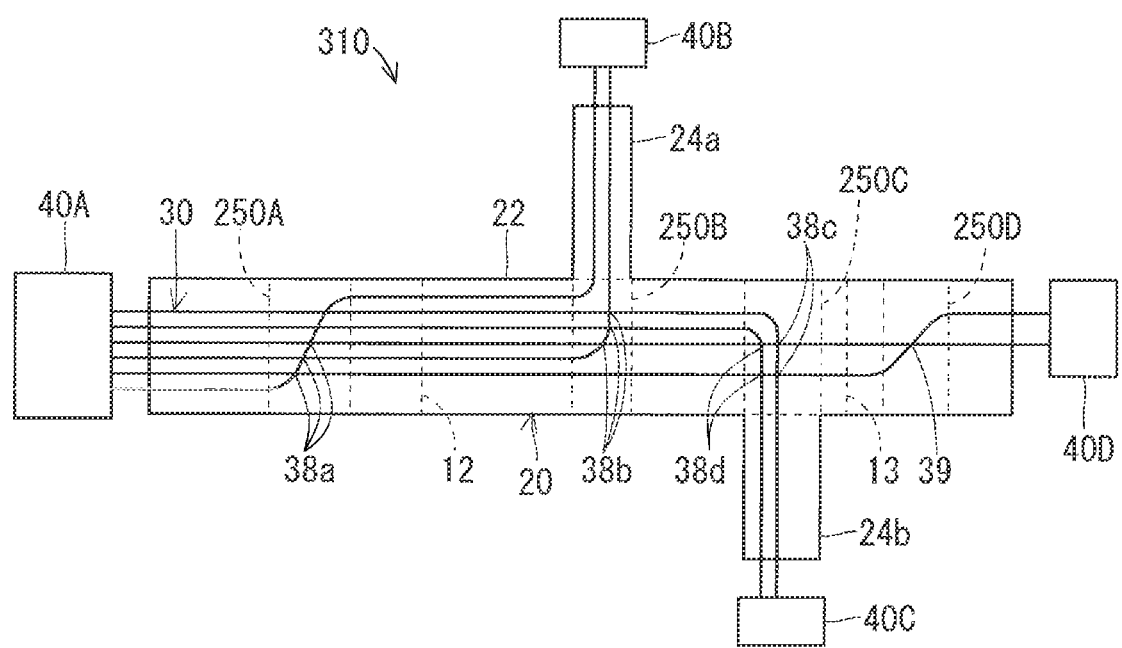

F I G. 6
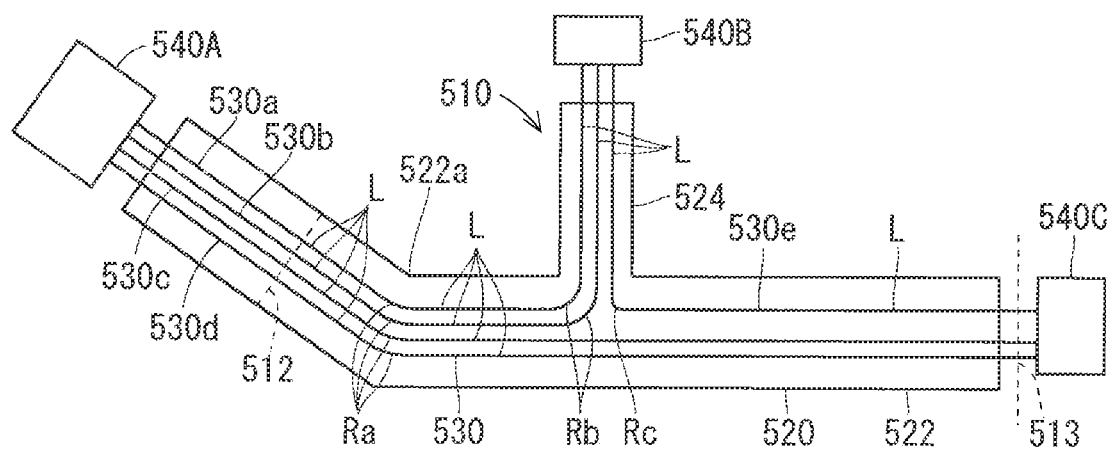

ABSTRACT# WIRING MEMBER AND WIRING MEMBER IN PACKAGED FORM

TECHNICAL FIELD

The present disclosure relates to a wiring member and a wiring member in packaged form.

BACKGROUND ART

Patent Document 1 discloses a wire harness including a functional outer covering member formed into a sheet shape, and wires disposed so as to overlap with the functional outer covering member in at least a partial region along a lengthwise direction, in which at least part of the portion at which insulating coverings of the wires and the functional outer covering member overlap with each other is welded.

CITATION LIST

Patent Documents

Patent Document 1: JP 2018-137208A

SUMMARY OF INVENTION

Technical Problem

The wire harness disclosed in Patent Document 1 can be made into a compact form by folding the functional outer covering member formed into a sheet shape during packaging, transport, or the like.

However, if the wire harness is folded, there is a risk that the paths of the wires will be disturbed on the functional outer covering member and separation will occur. For example, with the wire harness disclosed in Patent Document 1, a case is possible in which, according to the paths of the wires, the positions at which the wires are connected to the connector, and the like, one of the wires is disposed intersecting so as to span over another wire on the sheet-shaped function outer covering member. There is a risk that the holding force of the wire spanning over the other wire will weaken at the wire intersection portion. For this reason, if the functional outer covering member is folded at the wire intersection portion, there is a risk that the paths of the wires will be disturbed on the functional outer covering member or separation will occur.

In view of this, the present disclosure aims to suppress a case in which paths of linear transmission members are disturbed on a sheet-shaped member or the linear transmission members separate from the sheet-shaped member.

Solution to Problem

A wiring member according to the present disclosure is a wiring member including: a sheet-shaped member; and a plurality of linear transmission members fixed on the sheet-shaped member, in which the plurality of linear transmission members are fixed on the sheet-shaped member such that a portion of the plurality of linear transmission members intersects another said linear transmission member, and an intersection location of the plurality of linear transmission members is located away from a folding position.

A wiring member in a packaged form according to the present disclosure is a wiring member in a packaged form, including: a sheet-shaped member; and a plurality of linear transmission members fixed on the sheet-shaped member, in which the plurality of linear transmission members are fixed on the sheet-shaped member such that a portion of the plurality of linear transmission members intersects another said linear transmission member, the sheet-shaped member and the plurality of linear transmission members are folded to be put in a packaged form, and an intersection location of the plurality of linear transmission members is located away from a folding location.

Another wiring member according to the present disclosure is a wiring member, including: a sheet-shaped member; and a linear transmission member fixed on the sheet-shaped member, in which the linear transmission member includes a path bending portion following a bending path on the sheet-shaped member, and the path bending portion is located away from a folding location.

Another wiring member in a packaged form according to the present disclosure is a wiring member in a packaged form, including: a sheet-shaped member; and a linear transmission member fixed on the sheet-shaped member, in which the linear transmission member includes a path bending portion following a bending path on the sheet-shaped member, the sheet-shaped member and the plurality of linear transmission members are folded to be put in a packaged form, and the path bending portion is located away from a folding location.

Advantageous Effects of Disclosure

According to the present disclosure, a case can be suppressed in which the paths of the linear transmission members are disturbed on the sheet-shaped member or the linear transmission members are separated from the sheet-shaped member.

BRIEF DESCRIPTION OF DRAWINGS

FIG. 5 is an overall plan view showing a wiring member according to a third variation.

FIG. 6 is an overall plan view showing a wiring member according to an embodiment 2.

DESCRIPTION OF EMBODIMENTS

Figure 1:
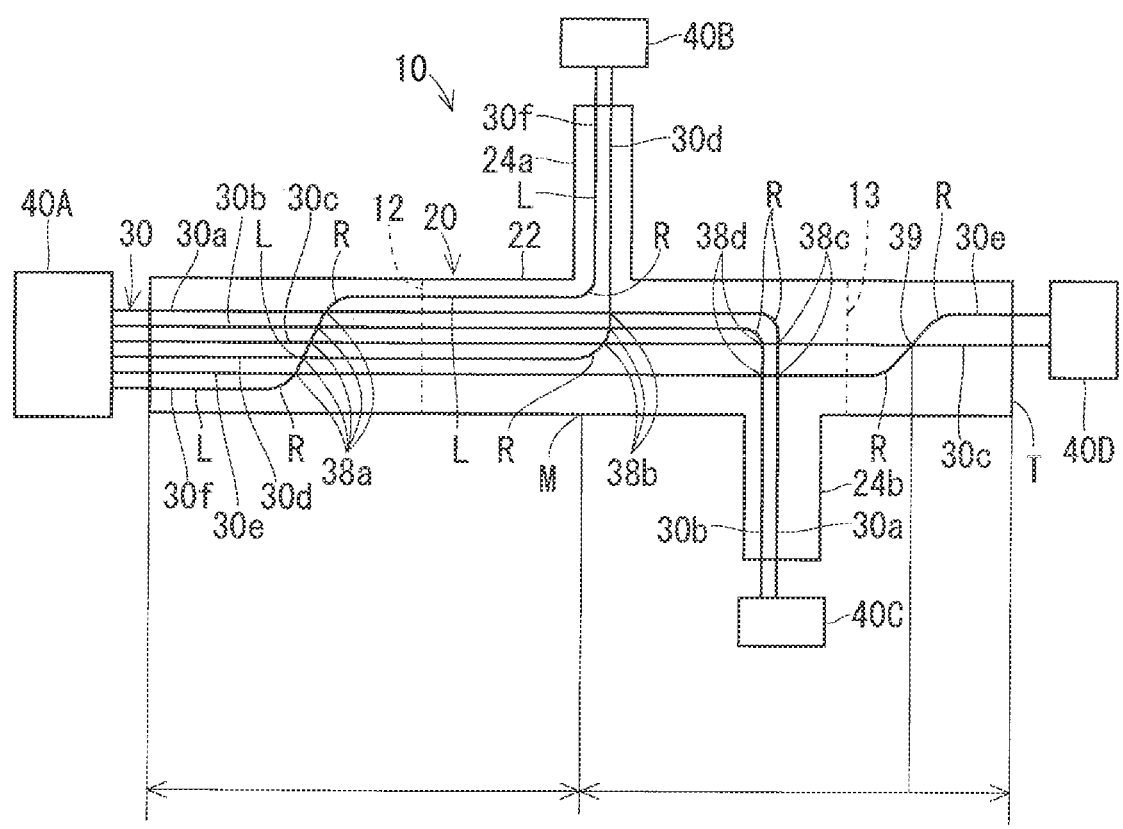
FIG. 1 is an overall plan view showing a wiring member according to an embodiment 1.

Description of Embodiments According to the Present Disclosure

Embodiments according to the present disclosure are listed and described firstly.

A wiring member according to the present disclosure is as follows.

(1) A wiring member includes: a sheet-shaped member; and a plurality of linear transmission members fixed on the sheet-shaped member, in which the plurality of linear transmission members are fixed on the sheet-shaped member such that a portion of the plurality of linear transmission members intersects another said linear transmission member, and an intersection location of the plurality of linear transmission members is located away from a folding position.

The intersection location of the plurality of linear transmission members is located away from the folding position in the sheet-shaped member, thus a case is suppressed in which the paths of the linear transmission members are disturbed on the sheet-shaped member or the linear transmission members are separated from the sheet-shaped member during packaging, transport, or the like.

(2) In the aspect of (1), the folding position may be a folding track. The sheet-shaped member is folded away from the intersection location of the plurality of linear transmission members, and a case is suppressed in which the paths of the linear transmission members are disturbed on the sheet-shaped member or the linear transmission members are separated from the sheet-shaped member.

(3) In the aspect of (1) or (2), the wiring member may further include a vehicle fixing portion that is attached to the sheet-shaped member, and the intersection location of the plurality of linear transmission members is located in a region of the sheet-shaped member that corresponds to the vehicle fixing portion. Normally, the sheet-shaped member is folded at a position away from the vehicle fixing portion. For this reason, when the intersection location of the plurality of linear transmission members includes an intersection location located in the region of the sheet-shaped member that corresponds to the vehicle fixing portion, the wiring member is not folded at that region, and a case is suppressed in which the paths of the linear transmission members are disturbed on the sheet-shaped member or the linear transmission members are separated from the sheet-shaped member.

(4) In any one of the aspects of (1) to (3), the intersection location of the plurality of linear transmission members may include an intersection location that is located near an end portion between a central portion in an extension direction of the sheet-shaped member and the end portion. Since the wiring member is folded during packaging, shipping, and the like in order to achieve compactness, there is little likelihood that the wiring member will be folded at a position near the end portion of the sheet-shaped member. In view of this, due to the intersection locations of the plurality of linear transmission members being located near the end portion between the central portion in the extension direction of the sheet-shaped member and the end portion, there is less likelihood that the intersection locations of the plurality of linear transmission members will be folded, and a case is suppressed in which the paths of the linear transmission members are disturbed on the sheet-shaped member or the linear transmission members are separated from the sheet-shaped member.

(5) In any one of the aspects of (1) to (4), a rigidity providing member that provides rigidity may be provided at the intersection location. Since the rigidity providing member that provides rigidity is provided at the intersection location, there is little likelihood that the wiring member will be folded at the intersection location. For this reason, a case is suppressed in which the paths of the linear transmission members are disturbed on the sheet-shaped member or the linear transmission members are separated from the sheet-shaped member.

A wiring member in a packaged form according to the present disclosure is as follows.

(6) A wiring member in a packaged form includes: a sheet-shaped member; and a plurality of linear transmission members fixed on the sheet-shaped member, in which the plurality of linear transmission members are fixed on the sheet-shaped member such that a portion of the plurality of linear transmission members intersects another said linear transmission member, the sheet-shaped member and the plurality of linear transmission members are folded to be put in a packaged form, and an intersection location of the plurality of linear transmission members is located away from a folding location. Since the intersection locations of the plurality of linear transmission members are located away from the bending location of the sheet-shaped member, a case is suppressed in which the paths of the linear transmission members are disturbed on the sheet-shaped member or the linear transmission members are separated from the sheet-shaped member.

A wiring member according to another aspect of the present disclosure is as follows.

(7) A wiring member includes: a sheet-shaped member; and a linear transmission member fixed on the sheet-shaped member, in which the linear transmission member includes a path bending portion following a bending path on the sheet-shaped member, and the path bending portion is located away from a folding location.

The path bending portion is located away from a folding location. For this reason, there is little likelihood that the wiring member will move laterally, and a case is suppressed in which the paths of the linear transmission members are disturbed on the sheet-shaped member or the linear transmission members are separated from the sheet-shaped member.

(8) In the aspect of (7), the folding position may be a folding track. The sheet-shaped member is folded away from the path bending portion, and there is little likelihood that the wiring member will move laterally, and a case is suppressed in which the paths of the linear transmission members are disturbed on the sheet-shaped member or the linear transmission members are separated from the sheet-shaped member.

(9) In the aspect of (7) or (8), the folding position may follow a direction orthogonal to the linear transmission member. Since the folding position follows the direction orthogonal to the linear transmission member, there is little likelihood that force of moving the linear transmission member laterally acts on the linear transmission member. Accordingly, a case is suppressed in which the paths of the linear transmission members are disturbed on the sheet-shaped member or the linear transmission members are separated from the sheet-shaped member.

(10) In any one of the aspects of (7) to (9), the linear transmission member may include a plurality of path straight portions following a straight path on the sheet-shaped member, and the path bending portion may be provided between the plurality of path straight portions. Since the path bending portion is provided between the plurality of path straight portions, a folding position can be easily set in at least one of the plurality of path straight portions, for example.

A wiring member in a packaged form according to another aspect of the present disclosure is as follows.

(11) A wiring member in a packaged form includes: a sheet-shaped member; and a linear transmission member fixed on the sheet-shaped member, in which the linear transmission member includes a path bending portion following a bending path on the sheet-shaped member, the sheet-shaped member and the plurality of linear transmission members are folded to be put in a packaged form, and the path bending portion is located away from a folding location.

Since the path bending portion is located away from a folding location, the sheet-shaped member is folded away from the path bending portion to be put in a packaged form. Accordingly, there is little likelihood that the wiring member will move laterally, and a case is suppressed in which the paths of the linear transmission members are disturbed on the sheet-shaped member or the linear transmission members are separated from the sheet-shaped member.

Details of Embodiments According to the Present Disclosure

A wiring member and a wiring member in a packaged form according to the present disclosure is described hereinafter with reference to the drawings. The present disclosure is not limited to these examples, but is indicated by claims, and it is intended that meanings equivalent to claims and all modifications within a scope of claims are included.

Embodiment 1

Figure 2:
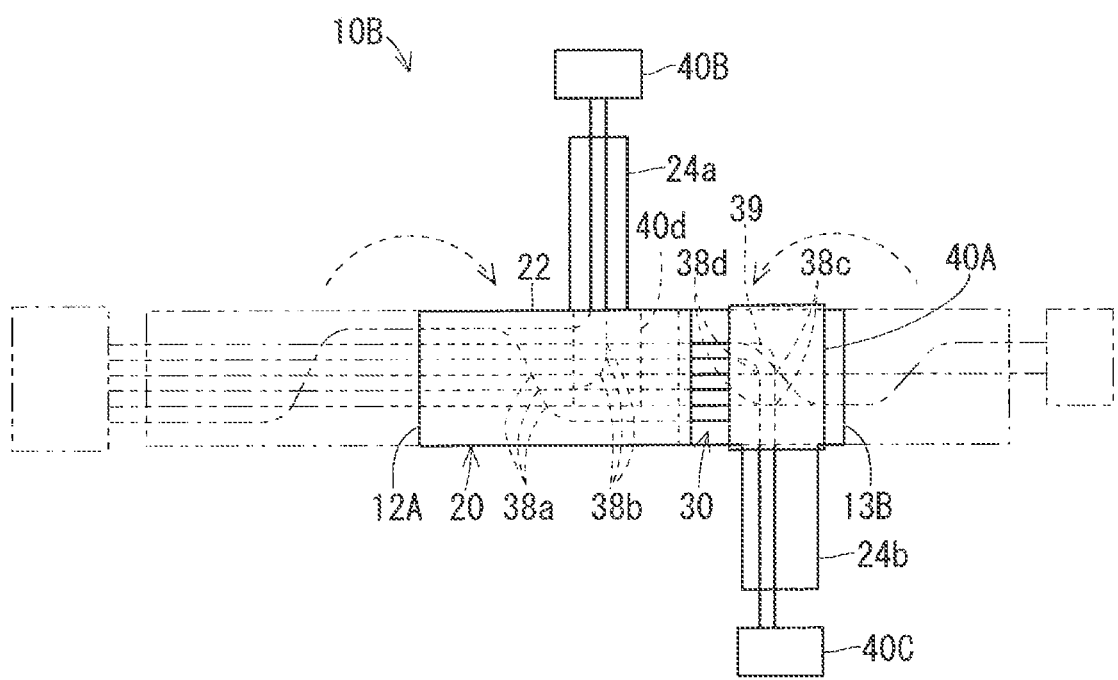
FIG. 2 is an overall plan view showing a wiring member in a packaged form according to the embodiment 1.

A wiring member and a wiring member in a packaged form according to an embodiment 1 will be described. FIG. 1 is an overall plan view showing a wiring member 10, and FIG. 2 is an overall plan view showing a state in which the wiring member 10 has been folded up, that is, a wiring member 10B in a packaged form.

The wiring member 10 includes a sheet-shaped member 20 and multiple linear transmission members 30. In the present example, the wiring member 10 also includes connectors 40A, 40B, 40C, and 40D.

The linear transmission member 30 is a linear member that transmits electricity or light. The sheet-shaped member 20 is a member in the form of a sheet. The multiple linear transmission members 30 are fixed on the sheet-shaped member 20. A portion of the multiple linear transmission members 30 is fixed on the sheet-shaped member 20 so as to intersect another linear transmission member 30. Folding tracks 12 and 13 are formed on the wiring member 10. That is, when the wiring member 10 is packaged, shipped, or the like, the wiring member 10 is folded and put in a compact packaged form. The folding tracks 12 and 13 are tracks along which the wiring member 10 is folded when formed in the packaged form. In the folding of the wiring member 10, the wiring member 10 need only be folded to such an extent that a portion of the wiring member 10 can overlap with another portion. A case in which the folding tracks 12 and 13 remain as creases on the sheet-shaped member 20, a case in which the folding tracks 12 and 13 remain as creases on the linear transmission members 30, and the like are envisioned. The multiple linear transmission members 30 intersect on the sheet-shaped member 20, and the intersection locations 38a, 38b, 38c, 38d, and 39 are located away from the folding tracks 12 and 13. Each of the folding tracks 12 and 13 described above indicates one example of a folding position. The folding position indicates a position where the wiring member is folded, and can be grasped as the folding tracks 12 and 13, for example. Examples of the folding track include that creases remain on the linear transmission members 30. The folding position is not limited to the folding tracks 12 and 13, but can be grasped as a position folded as a packaged form.

The connectors 40A, 40B, 40C, and 40D are components that are to be connected to components mounted in a vehicle. The end portions of the multiple linear transmission members 30 are each connected to one of the connectors 40A, 40B, 40C, and 40D. Due to the connectors 40A, 40B, 40C, and 40D being connected to the partner-side connectors mounted in the vehicle, the linear transmission members 30 and the corresponding components are electrically connected or are connected so as to be able to transmit and receive optical signals.

In a state in which the wiring member 10 is mounted in the vehicle, the multiple connectors 40A, 40B, 40C, and 40D are connected to respective components mounted in the vehicle. Accordingly, transmission and reception of electrical signals, transmission and reception of electricity, and transmission and reception of optical signals are performed between the components mounted in the vehicle. That is, the wiring member 10 is a wiring component that connects components mounted in the vehicle. In particular, in the wiring member 10, due to the fact that the multiple linear transmission members 30 branch, it is possible to connect multiple components via a branched route.

The portions will be described more specifically.

The linear transmission member 30 need only be a linear member that transmits electricity, light, or the like. For example, the linear transmission member may be a common wire having a core wire and a covering around the core wire, and may also be a bare conductive wire, a shielded wire, an enamel wire, a nichrome wire, an optical fiber, or the like.

Various types of signal lines and various types of power lines may also be used as a linear transmission member that transmits electricity. A linear transmission member that transmits electricity may also be used as an antenna, a coil, or the like that sends signals or electricity to a space or receives signals or electricity from a space.

Here, description will be given assuming that the linear transmission member 30 is a common wire 30 (hereinafter simply referred to as a wire 30). The wire 30 includes a core wire serving as a transmission wire main body and an insulating covering serving as a covering that covers the core wire. The descriptions relating to the wire can be applied to each illustrated object of the linear transmission member, except for configurations to which they cannot be applied.

The core wire is constituted by one or multiple strands. The strand is constituted by a conductor such as copper, a copper alloy, aluminum, or an aluminum alloy. If the core wire is constituted by multiple strands, the multiple strands may also be twisted. The insulating covering is formed due to a resin material such as PVC (polyvinyl chloride) or PE (polyethylene) being extrusion molded around the core wire or the like. Here, the wire 30 is a so-called round wire with a circular transverse cross section.

The sheet-shaped member 20 is a flexible sheet-shaped member that can hold the wires 30 in a state of being positioned two-dimensionally, and that can be folded.

Although there is no particular limitation on the material constituting the sheet-shaped member 20, the sheet-shaped member 20 is preferably constituted by a material including a resin such as PVC (polyvinyl chloride), PET (polyethylene terephthalate), or PP (polypropylene). The sheet-shaped member may also be a sheet member in which the interior is uniformly embedded, a nonwoven sheet, or the like. The sheet-shaped member 20 can also include a material such as a metal. The sheet-shaped member 20 may also be a single layer, or multiple layers may be stacked. If multiple layers are stacked, for example, it is conceivable that resin layers are stacked. Also, for example, it is conceivable that a resin layer and a metal layer are stacked.

The wires 30 are fixed on one main surface of the sheet-shaped member 20. The wires 30 are fixed along a certain path on the one main surface of the sheet-shaped member 20.

Multiple wires 30 are fixed on the one main surface of the sheet-shaped member 20. The paths of the wires 30 on the sheet-shaped member 20 may be linear or may be paths that bend at an intermediate location. The multiple wires branch at an intermediate location on the one main surface of the sheet-shaped member 20.

More specifically, the sheet-shaped member 20 includes a first sheet-shaped portion 22 and second sheet-shaped portions 24a and 24b. The second sheet-shaped portions 24a and 24b bend at intermediate portions in the extension direction of the first sheet-shaped portion 22 and branch to the sides of the first sheet-shaped portion 22. Here, the first sheet-shaped portion 22 is formed into a band shape that is elongated and extends straight. The first sheet-shaped portion may also be bent. The second sheet-shaped portions 24a and 24b are formed into band shapes that are elongated and extend straight. The second sheet-shaped portion 24a branches so as to extend from an intermediate portion in the extension direction of one side portion of the first sheet-shaped portion 22 toward the outside of one side of the first sheet-shaped portion 22. The second sheet-shaped portion 24b branches so as to extend from an intermediate portion in the extension direction of the other side portion of the first sheet-shaped portion 22 to the outside of the other side of the first sheet-shaped portion 22. Here, the second sheet-shaped portions 24a and 24b are provided at different locations in the extension direction of the first sheet-shaped portion 22. Here, the second sheet-shaped portion 24a is provided near one end of the first sheet-shaped portion 22 and the second sheet-shaped portion 24b is provided near another end of the first sheet-shaped portion 22. If multiple second sheet-shaped portions are provided, two of the second sheet-shaped portions may also be provided at the same position in the extension direction of the first sheet-shaped portion. Also, the second sheet-shaped portions 24a and 24b extend in an orientation that is orthogonal to the extension direction of the first sheet-shaped portion 22. The second sheet-shaped portions may also extend in an oblique direction with respect to the extension direction of the first sheet-shaped portion. There may also be 1 or 3 or more second sheet-shaped portions.

For the sake of convenience, the multiple wires 30 are distinguished as wires 30a, 30b, 30c, 30d, 30e, and 30f. Hereinafter, if it is necessary to distinguish the wires 30, distinguishing will be performed using the same reference numerals. The multiple wires 30a, 30b, 30c, 30d, 30e, and 30f are fixed to the first sheet-shaped portion 22 in an aligned state on one end side of the first sheet-shaped portion 22. The multiple wires 30a, 30b, 30c, 30d, 30e, and 30f are connected to a connector 40A at one end portion of the first sheet-shaped portion 22. The connector 40A is constituted such that terminals are stored in a housing in a predetermined alignment sequence. The alignment of the multiple wires 30a, 30b, 30c, 30d, 30e, and 30f is determined according to the alignment in which the terminals connected to the multiple wires 30a, 30b, 30c, 30d, 30e, and 30f are stored in the housing. The connector 40A may also be fixed to the sheet-shaped member 20. The end portions of the wires 30a, 30b, 30c, 30d, 30e, and 30f may also extend from the sheet-shaped member 20 and be connected to the connector 40A. The same applies to the other connectors 40B, 40C, and 40D as well.

A portion of the wires 30f is bent at an intermediate location at an intermediate portion between one end of the first sheet-shaped member 22 and the second sheet-shaped member 24a in the extension direction of the first sheet-shaped portion 22, and intersects the other wires 30a, 30b, 30c, 30d, and 30e in an oblique orientation. The locations at which the wire 30f intersects the wires 30a, 30b, 30c, 30d and 30e are examples of intersection locations 38a. Due to the fact that the wire 30f intersects the wires 30a, 30b, 30c, 30d, and 30e in an oblique orientation, the wire 30f can be bent at a moderate angle. The wire 30f is fixed at an intermediate portion in the extension direction of the first sheet-shaped portion 22 in a state of being aligned with the other wires 30a, 30b, 30c, 30d, and 30e from the intersection location 38a to the other end of the first sheet-shaped portion 22. The wire 30f bends toward a first side portion of the first sheet-shaped portion 22 at the location at which the second sheet-shaped portion 24a is provided, branches with respect to the other wires 30a, 30b, 30c, and 30e, and extends toward the second sheet-shaped member 24a. Another partial wire 30d bends from an original position at an intermediate location at a location at which the second sheet-shaped portion 24a is provided, branches with respect to the other wires 30a, 30b, 30c, and 30e, and extends toward the second sheet-shaped portion 24a. On the second sheet-shaped portion 24a, some wires 30d and 30f branch with respect to the other wires 30a, 30b, 30c, and 30e, extend in an orientation of being orthogonal thereto, and are fixed in an aligned state on the second sheet-shaped portion 24a. The locations at which the wire 30d intersects the other wires 30a, 30b, and 30c are examples of intersection locations 38b. The intersection locations 38a and 38b are examples of locations at which a portion of the plurality of linear transmission members intersects so as to branch with respect to the other linear transmission members.

The wires 30d and 30f are connected to the connector 40B at the end portion of the second sheet-shaped portion 24a. The alignment sequence of the wires 30d and 30f is also determined according to the arrangement in which the terminals connected to the end portions of the wires 30d and 30f are stored in the connector 40B.

Some wires 30a and 30b are bent from the original portions at an intermediate portion and branch with respect to the other wires 30c and 30e at an intermediate portion in the extension direction of the first sheet-shaped portion 22, which is a position located away from the other end side of the first sheet-shaped portion 22 relative to the above-described wires 30d and 30f. Some wires 30a and 30b extend in an orientation of branching and being orthogonal with respect to the other wires 30c and 30e. The bend radii of the wires 30a and 30b may be the same as, smaller than, or greater than the interval of the wires 30a, 30b, 30c, 30d, 30e, and 30f. Here, the locations at which the wire 30a intersects the other wires 30c and 30o are intersection locations 38c. Also, the locations at which the wire 30b intersects the other wires 30c and 30e are intersection locations 38d. The intersection locations 38c and 38d are examples of locations at which a portion of the plurality of linear transmission members intersect so as to branch with respect to the other linear transmission members.

The wires 30a and 30c branch with respect to the other wires 30c and 30e on the first sheet-shaped portion 22, extend toward the second sheet-shaped portion 24b, and are fixed in an aligned state on the second sheet-shaped portion 24b. The wires 30a and 30b are connected to the connector 40C at the end portion of the second sheet-shaped portion 24b. The alignment sequence of the wires 30a and 30b is also determined according to the arrangement in which terminals to be connected to the end portions of the wires 30a and 30b are stored in the connector 40C.

The remaining wires 30c and 30e extend toward the other end portion of the first sheet-shaped portion 22. The alignment sequence of the wires 30c and 30e at the other end portion of the first sheet-shaped portion 22 is determined according to the arrangement in which terminals to be connected to the end portions of the wires 30a and 30b are stored in the connector 40D. Here, the alignment sequence of the wires 30c and 30e at the other end portion of the first sheet-shaped portion 22 and the alignment sequence of the wires 30c and 30e at the one end portion of the first sheet-shaped portion 22 differ from each other according to the storage positions of the terminals in the connectors 40A and 40D. In view of this, the wire 30e bends at an intermediate portion and intersects the wire 30c such that the alignment sequence of the multiple wires 30c and 30e is changed. Here, at an intermediate portion between the intersection locations 38c and 38d and the other end portion of the first sheet-shaped portion 22, the wire 30e is bent so as to intersect the wire 30c, and extends parallel to the wire 30c at a position near the other end portion of the first sheet-shaped member 22. Here, the wire 30e intersects the wire 30c in an oblique orientation, and the portions on both sides of the wire 30e that intersect the wire 30c extend in a parallel orientation with respect to the wire 30c. Due to the fact that the wire 30e intersects the wire 30c in an oblique orientation, it is possible to make the bending of the wire 30e moderate. The portions between the portion of the wire 30e that intersects the wire 30c and the portions of the wire 30e that extend parallel to the wire 30c are bent curvilinearly. Similarly to the above description, the bend radii may be the same as, smaller than, or greater than the interval of the wires 30a, 30b, 30c, 30d, 30e, and 30f. The intersection location 39 of the wire 30c and the wire 30e is an example of a location at which the wire 30c and the wire 30e intersect each other such that the alignment sequence of the wires 30c and 30e is changed. The wires 30c and 30e are fixed in an aligned state on the other end portion of the first sheet-shaped portion 22. The wires 30c and 30e are connected to the connector 40D at the other end portion of the first sheet-shaped portion 22.

Folding tracks 12 and 13 are formed on the wiring member 10. The folding tracks 12 and 13 are tracks along which the wiring member 10 was folded in order to put it in a compact packaged form for the purpose of packaging, shipping, or the like. Here, the wiring member 10 is folded at two locations in the extension direction of the first sheet-shaped portion 22. The folding lines (lines that are to be the folding tracks 12 and 13 when the wiring member 10 is expanded after being folded) are orthogonal to the extension direction of the first sheet-shaped portion 22. One folding line (corresponds to the folding track 12) is located between one end portion of the first sheet-shaped portion 22 and the second sheet-shaped portion 24a. The other folding line (corresponds to the folding track 13) is located between the other end portion of the first sheet-shaped portion 22 and the second sheet-shaped portion 24b, near the second sheet-shaped portion 24b. The method of folding the wiring member 10 is not limited to the above example, and the wiring member 10 may also be folded at one location or three or more locations. The wiring member 10 may also be folded along a line that is oblique with respect to the extension direction of the first sheet-shaped portion 22.

The above-described intersection locations 38a, 38b, 38c, 38d, and 39 are located away from the folding tracks 12 and 13. More specifically, the intersection location 38a is located near one end of the first sheet-shaped portion 22 with respect to the bending track 12 on the first sheet-shaped portion 22. On the first sheet-shaped portion 22, the intersection locations 38b, 38c, and 38d are located between the bending track 12 and the bending track 13. The intersection location 39 is located near the other end of the first sheet-shaped portion 22 with respect to the bending track 13 on the first sheet-shaped portion 22.

The intersection locations 38a and 39 may also be located near the end portion between the central portion M in the extension direction of the sheet-shaped member 20 and the end portion. Here, the longest first sheet-shaped portion 22 of the sheet-shaped member 20 is used as a reference, and the central portion in the extension direction thereof is set as M. The intersection location 39 is present at a position near another end portion T between the central portion M and the other end portion T of the first sheet-shaped portion 22. Since the sheet-shaped member 20 is folded in order to make it as compact as possible, folding the sheet-shaped member 20 at the end portion has little effect on the requirement of compactness. For this reason, since the sheet-shaped member 20 is not often folded at the end portion, a case is suppressed in which the intersection location 39 is folded by providing the intersection location 39 at a position near the end portion T.

Note that the mode by which the wires 30 and the sheet-shaped member are fixed to each other may be contact site fixing, non-contact site fixing, or both. Here, in contact site fixing, the portions at which the wires 30 and the sheet-shaped member 20 are in contact with each other are fixed by sticking together. Also, non-contact site fixing is a fixing mode that is not contact site fixing. For example, a thread, another sheet member, adhesive tape, or the like presses the wires 30 into the sheet-shaped member 20, a thread, another sheet member, adhesive tape, or the like sandwich the wires 30 and the sheet-shaped member 20 in a state of surrounding the wires 30 and the sheet-shaped member or the like, and thus the wires 30 and the sheet-shaped member 20 are kept in the state of being fixed to each other. In the present example, it is envisioned that the wires 30 and the sheet-shaped member 20 are in a state of contact site fixing. The descriptions relating to contact site fixing can also be applied to non-contact site fixing as long as it is not a configuration to which contact site fixing cannot be applied.

As the mode of contact site fixing, contact site indirect fixing may be used, contact site direct fixing may be used, or both may be used in different regions. Here, in contact site indirect fixing, the wires 30 and the sheet-shaped member 20 are fixed to each other by sticking together indirectly via an intervening member such as an adhesive, a pressure sensitive adhesive, or double-sided adhesive tape provided therebetween. Also, in contact site direct fixing, the wires 30 and the sheet-shaped member 20 are fixed to each other by sticking together directly without use of a separately-provided adhesive or the like. In contact site direct fixing, for example, it is conceivable that the wires 30 and the sheet-shaped member 20 are fixed by sticking together due to resin included in at least one of the wires 30 and the sheet-shaped member 20 being melted. Hereinafter, the wires 30 and the sheet-shaped member 20 will be described as being in a state of contact site direct fixing. The descriptions relating to contact site direct fixing can be applied also to contact site indirect fixing, as long as it is not a configuration to which contact site direct fixing cannot be applied.

When the state of contact site direct fixing is formed, it is also conceivable that the resin is melted by heat, or is melted using a solvent. That is, the state of contact site direct fixing may also be a state of contact site direct fixing achieved through heat, or may be a state of contact site direct fixing achieved using a solvent. It is preferable that the state is the state of contact site direct fixing achieved through heat.

There is no particular limitation on the configuration of forming the state of contact site direct fixing at this time, and various types of configurations including known configurations such as welding, fusion, and fusion welding can be used. For example, if the state of contact site direct fixing achieved through heat is formed through welding, it is possible to use various welding configurations, such as ultrasonic welding, pressurized heat welding, hot-air welding, and high-frequency welding. When the state of contact site direct fixing is formed through these configurations, the wires 30 and the sheet-shaped member 20 are put in a state of contact site direct fixing achieved through the configuration. Specifically, for example, when the state of contact site direct fixing is formed through ultrasonic welding, the wires 30 and the sheet-shaped member 20 are put in a state of contact site direct fixing achieved through ultrasonic welding. The portions (fixed portions of the wires 30 and the sheet-shaped members 20) obtained by forming the state of contact site direct fixing achieved through heat through welding may also be referred to as welded portions, and among them, a fixed portion achieved through ultrasonic welding may be referred to as an ultrasonic-welded portion, a fixed portion achieved through pressurized heat welding may be referred to as a pressurized-heat-welded portion, and the like.

In the case of contact site direct fixing, only the resin included in the coverings of the wires 30 may be melted, or only the resin included in the sheet-shaped member 20 may be melted. In these cases, a state is entered in which the melted resin sticks to the other outer surface, and a relatively distinct interface is formed in some cases. Also, in the case of contact site direct fixing, both the resin included in the covering of the wires 30 and the resin included in the sheet-shaped member 20 may be melted. In this case, both resins mix together and a distinct interface is not formed in some cases. In particular, if the covering of the wires 30 and the sheet-shaped member 20 include resin that is easily compatibilized, such as the same resin materials, or the like, both resins mix together and a distinct interface is not formed in some cases.

The form in which the above-described wiring member 10 is folded, that is, the wiring member 10B in the packaged form, is in a state in which the intersection locations 38a, 38b, 38c, 38d, and 39 of the multiple wires 30 are located away from the bending locations 12A and 13A (see FIG. 2). When the packaged form is expanded, a state is entered in which the intersection locations 38a, 38b, 38c, 38d, and 39 of the multiple wires 30 are located away from the bending tracks 12 and 13, which are the tracks of the folding locations 12A and 13A (see FIG. 1). The folding tracks 12 and 13 are observed as tracks remaining as creases on the sheet-shaped member 20, or tracks remaining as creases on the wires 30.

According to the thus-configured wiring member 10B in the packaged form, the intersection locations 38a, 38b, 38c, 38d, and 39 of the multiple wires 30 are located away from the bending locations 12A and 13A of the sheet-shaped member 20, and therefore a case is suppressed in which the paths of the wires 30 are disturbed on the sheet-shaped member 20 or the wires 30 separate from the sheet-shaped member 20. Also, in the wiring member 10 as well, the intersection locations 38a, 38b, 38c, 38d, and 39 of the multiple wires 30 are located away from the folding tracks 12 and 13 of the sheet-shaped member 20, and therefore during packaging, shipping, or the like, the sheet-shaped member 20 is folded away from the intersection locations 38a, 38b, 38c, 38d, and 39 of the multiple wires 30. For this reason, a case is suppressed in which the paths of the wires 30 are disturbed on the sheet-shaped member 20 or the wires 30 separate from the sheet-shaped member 20.

Also, since the wiring member 10 is folded during packaging, shipping, and the like in order to achieve compactness, there is little likelihood that the wiring member 10 will be folded at a position near the end portion of the sheet-shaped member 20. In view of this, due to the intersection locations 38a and 39 of the wires 30 being located near the end portion T between the central portion M in the extension direction of the sheet-shaped member 20 and the end portion T, the likelihood that the intersection locations 38a and 39 of the multiple wires 30 will be folded decreases, and a case is suppressed in which the paths of the wires 30 are disturbed on the sheet-shaped member 20 or the wires 30 separate from the sheet-shaped member 20.

Variations

Various variations will be described premised on the above-described embodiment.

Figure 3:
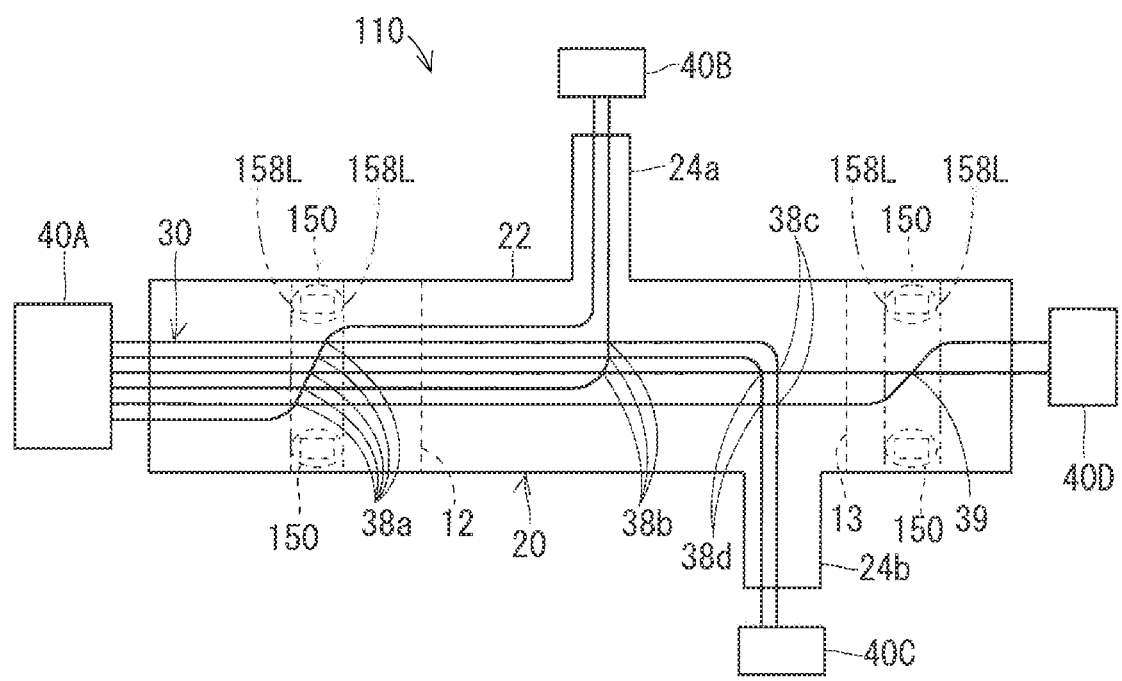
FIG. 3 is an overall plan view showing a wiring member according to a first variation.

FIG. 3 is an overall plan view showing a wiring member 110 according to a first variation. This wiring member 110 further includes a vehicle fixing portion 150 that is attached to the sheet-shaped member 20.

The vehicle fixing portion 150 is a component that can be fixed to the vehicle. For example, a component that can engage and be fixed by being fit into a hole formed in the vehicle, or a component called a clamp or a clip, can be used as the vehicle fixing portion 150. Various types of fixing structures, such as fixing using ultrasonic welding, thermal welding, an adhesive, or a pressure-sensitive adhesive, or grip fixing, can be employed as the fixing structure of the vehicle fixing portion 150 to the sheet-shaped member 20.

The vehicle fixing portion 150 is fixed to a portion in the extension direction of the first sheet-shaped portion 22 of the sheet-shaped member 20. Here, the vehicle fixing portion 150 is provided between one end portion of the first sheet-shaped portion 22 and the folding track 12. The vehicle fixing portion 150 is provided on both side portions of the first sheet-shaped portion 22. The vehicle fixing portion 150 may also be provided on only one side of the first sheet-shaped portion 22, and may be provided in the central portion in the width direction of the first sheet-shaped portion 22.

The intersection location 38a is located in a region of the sheet-shaped member 20 that corresponds to the vehicle fixing portion 150. Here, the intersection location 38a is located inside of a pair of lines 158L obtained by extending both ends of the vehicle fixing portion 150 in the extension direction of the first sheet-shaped portion 22 in the direction orthogonal to the extension direction of the first sheet-shaped portion 22.

The vehicle fixing portion 150 is provided also between the other end portion of the first sheet-shaped portion 22 and the bending track 13. The intersection location 39 is located in a region of the sheet-shaped member 20 that corresponds to the vehicle fixing portion 150.

The vehicle fixing portion 150 is a component that is made of resin, metal, or the like, and the first sheet-shaped portion 22 is difficult to bend at the region in which the vehicle fixing portion 150 is provided. For this reason, the sheet-shaped member 20 is folded at a position away from the vehicle fixing portion 150. For this reason, the wiring member 110 is not folded at the intersection locations 38a and 39, and a case is suppressed in which the paths of the wires 30 are disturbed on the sheet-shaped member 20 or the wires 30 separate from the sheet-shaped member 20.

Figure 4:
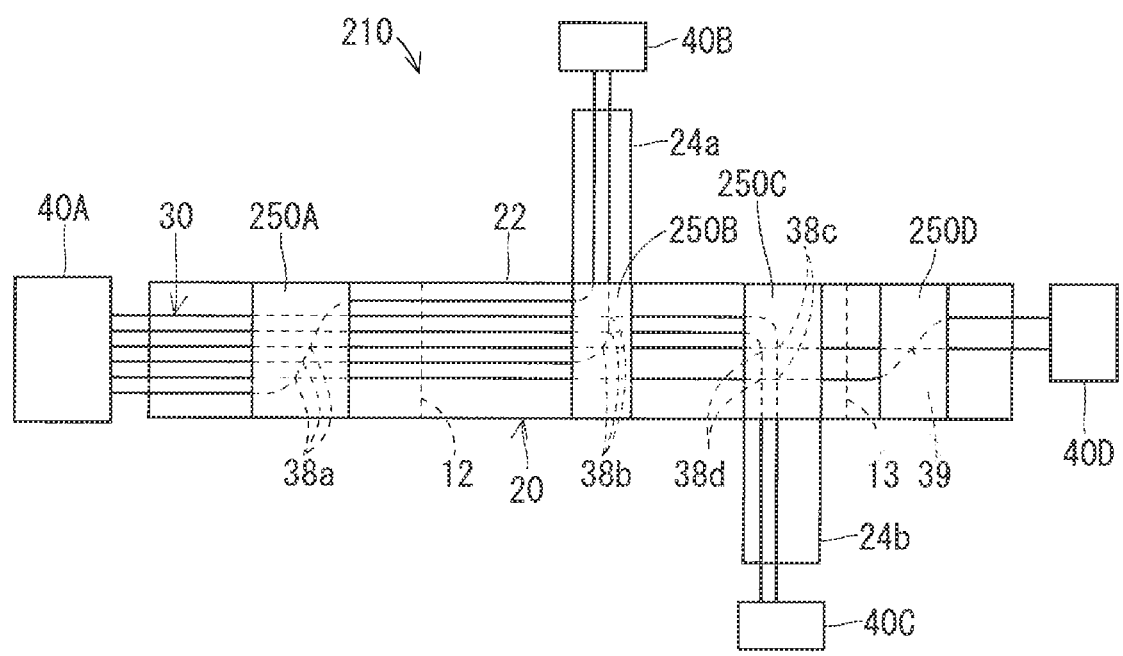
FIG. 4 is an overall plan view showing a wiring member according to a second variation.

FIG. 4 is an overall plan view showing a wiring member 210 according to a second variation. This wiring member 210 is provided with rigidity providing members 250A, 250B, 250C, and 250D that provide rigidity to the intersection locations 38a, 38b, 38c, 38d, and 39.

The rigidity providing members 250A, 250B, 250C, and 250D are formed into sheet shapes, and are fixed to the sheet-shaped member 20 so as to cover the wires 30 from the side on which the wires 30 are fixed to the sheet-shaped member 20. The rigidity providing member 250A covers the entire region in the width direction of the first sheet-shaped portion 22 including the intersection location 38a so as to provide rigidity to the intersection location 38a. The rigidity providing member 250B covers the entire region in the width direction of the first sheet-shaped portion 22 including the intersection location 38b so as to provide rigidity to the intersection location 38b. The rigidity providing member 250C covers the entire region in the width direction of the first sheet-shaped portion 22 including the intersection locations 38c and 38d so as to provide rigidity to the intersection locations 38c and 38d. The rigidity providing member 250D covers the entire region in the width direction of the first sheet-shaped portion 22 including the intersection location 39 so as to provide rigidity to the intersection location 39. The rigidity providing members 250A, 250B, 250C, and 250D do not need to cover the entirety in the width direction of the first sheet-shaped portion 22, but need only cover at least the intersection locations 38a, 38b, 38c, 38d, and 39. Also, the rigidity providing members 250A, 250B, 250C, and 250D need not be provided for all of the intersection locations 38a, 38b, 38c, 38d, and 39. The rigidity providing members may also be provided at only a portion of the intersection locations 38a, 38b, 38c, 38d, and 39.

The rigidity providing members 250A, 250B, 250C, and 250D may also be provided in a wider region for the sheet-shaped member 20. For example, the rigidity providing member may also be provided in the entire region away from the linear regions of the first sheet-shaped member 22 that are to be the folding tracks 12 and 13.

Resin sheets of PVC, PE, PET, PP, PA, or the like, or metal sheets of aluminum, copper, or the like may be used as the rigidity providing members 250A, 250A, 250B, 250C, and 250D. Also, the rigidity providing members 250A, 250A, 250B, 250C, and 250D may be a resin material such as a woven fabric, a knitted fabric, or a nonwoven fabric, or may be a molded material such as a member obtained through extrusion molding, injection molding, or the like. Also, the rigidity providing members 250A, 250A, 250B, 250C, and 250D may be a foam material that is foam-molded, or may be a solid material that is uniformly solid without being foam-molded. Also, the rigidity providing members 250A, 250A, 250B, 250C, and 250D may have only one layer, or may have multiple layers.

The fixing of the rigidity providing members 250A, 250A, 250B, 250C, and 250D to the sheet-shaped members 20 may be performed using any configuration. For example, the rigidity providing members 250A, 250A, 250B, 250C, and 250D may also be fixed to the sheet-shaped member 20 in a lateral region of the main surface of the sheet-shaped member 20 away from the paths of the wires 30. Also, the rigidity providing members 250A, 250A, 250B, 250C, and 250D may also be fixed to the sheet-shaped member 20 in the entire region in the width direction of the sheet-shaped member 20.

A configuration that is the same as that in which the wires 30 are fixed to the sheet-shaped member 20 can be employed as the fixing mode of the cover 160 and the sheet-shaped member 20. That is, the fixing mode of both members may be contact site fixing, non-contact site fixing, or both. Also, as the mode of contact site fixing, contact site indirect fixing may be used, contact site direct fixing may be used, or both may be used in different regions. For example, the rigidity providing members 250A, 250A, 250B, 250C, and 250D can be fixed to the sheet-shaped member 20 using ultrasonic welding, pressurized heat welding, hot-air welding, high-frequency welding, or the like.

According to this variation, the rigidity providing members 250A, 250B, 250C, and 250D that provide rigidity to the intersection locations 38a, 38b, 38c, 38d, and 39 are provided, and therefore the wiring member 10 is difficult to bend at the intersection locations 38a, 38b, 38c, 38d, and 39. For this reason, a case is suppressed in which the paths of the wires 30 are disturbed on the sheet-shaped member 20 or the wires 30 separate from the sheet-shaped member 20. Also, since the rigidity providing members 250A, 250B, 250C, and 250D cover the intersection locations 38a, 38b, 38c, 38d, and 39, from this viewpoint as well, a case is suppressed in which the paths of the wires 30 are disturbed on the sheet-shaped member 20 or the wires 30 separate from the sheet-shaped member 20.

It is not essential that the rigidity providing members 250A, 250A, 250B, 250C, and 250D cover the intersection locations 38a, 38b, 38c, 38d, and 39. For example, as with a wiring member 310 according to a third variation shown in FIG. 5, the rigidity providing members 250A, 250A, 250B, 250C, and 250D may be fixed to the sheet-shaped member 20 from the side opposite to the side on which the wires 30 are fixed to the sheet-shaped member 20.

Embodiment 2

Figure 7:
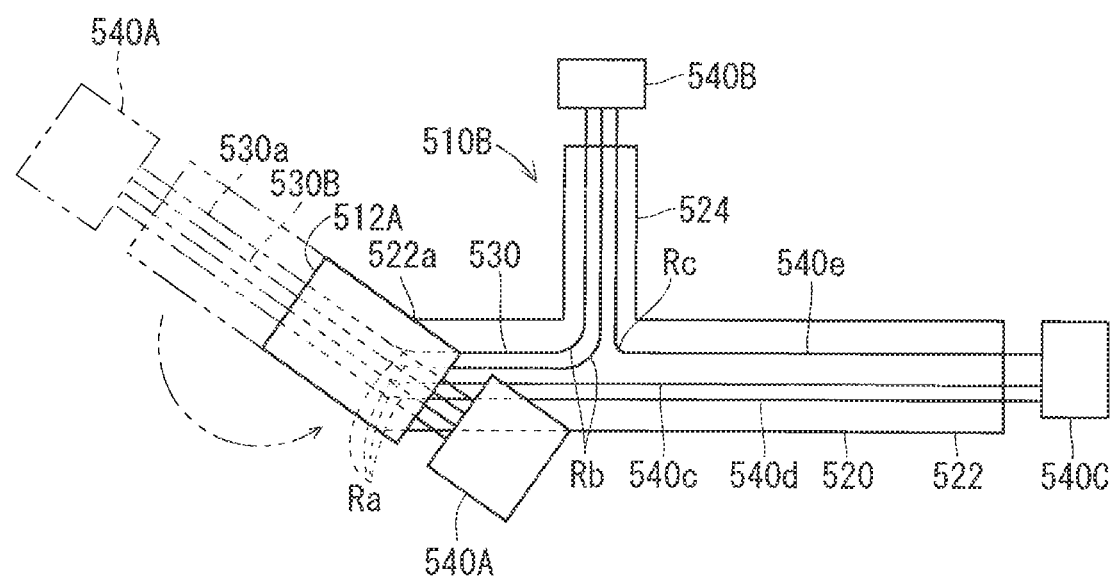
FIG. 7 is an overall plan view showing a wiring member in a packaged form according to the embodiment 2.

A wiring member 510 according to an embodiment 2 will be described. FIG. 6 is an overall plan view showing the wiring member 510, and FIG. 7 is an overall plan view showing a state in which the wiring member 510 has been folded up, that is, a wiring member 510B in a packaged form. The embodiment 2 mainly describes a difference with the embodiment 1.

The wiring member 510 includes a sheet-shaped member 520 and multiple linear transmission members 530. In the present example, the wiring member 510 also includes connectors 540A, 540B, and 540C.

The linear transmission member 530 is a linear member that transmits electricity or light. The sheet-shaped member 520 is a member in the form of a sheet. The multiple linear transmission members 530 are fixed on the sheet-shaped member 520. The multiple linear transmission members 530 include path bending portions Ra, Rb, and Rc following a bending path on the sheet-shaped member 520. In other words, the linear transmission members 530 is fixed to the sheet-shaped members 520 so that portions thereof draw the path bending portions Ra, Rb, and Rc. The path bending portions Ra, Rb, and Rc are portions bended on a main surface of the sheet-shaped member 520 when the main surface is observed. Folding track 512 is formed on the wiring member 510. That is, when the wiring member 510 is packaged, shipped, or the like, the wiring member 510 is folded and put in a compact packaged form (refer to FIG. 7).

The folding track 512 is a track along which the wiring member 510 is folded when formed in the packaged form. In the folding of the wiring member 510, the wiring member 510 need only be folded to such an extent that a portion of the wiring member 510 can overlap with another portion. A case in which the folding track 512 remains as a crease on the sheet-shaped member 520, a case in which the folding track 512 remains as a crease on the linear transmission member 530, and the like are envisioned. The path bending portions Ra, Rb, and Rc described above are located away from the folding track 512. The folding track 512 indicates one example of a folding position in the manner similar to the above embodiment. The folding position indicates a position where the wiring member is folded, and can be grasped as the folding track 512, for example. Examples of the folding track include that a crease remains on the linear transmission member 530. The folding position is not limited to the folding track 512, but can be grasped as a position folded as a packaged form.

The connectors 540A, 540B, and 540C are components similar to the connectors 40A, 40B, 40C, and 40D described above. End portions of the multiple linear transmission members 530 are each connected to one of the connectors 540A, 540B, and 540C. In a state in which the present wiring member 510 is mounted in the vehicle, the multiple connectors 540A, 540B, and 540C are connected to respective components mounted in the vehicle.

The portions will be described more specifically.

The linear transmission member 530 need only be a linear member that transmits electricity, light, or the like in the manner similar to the linear transmission member 30 in the embodiment 1. Described herein is an example that the linear transmission member 530 is the wire 530.

The sheet-shaped member 520 is a flexible sheet-shaped member that can hold the wires 530 in a state of being positioned two-dimensionally in the manner similar to the sheet-shaped member 20 in the above embodiment 1, and that can be folded.

The wires 530 are fixed on one main surface of the sheet-shaped member 520. The wires 530 are fixed along a certain path on the one main surface of the sheet-shaped member 520. Multiple wires 530 are fixed on the one main surface of the sheet-shaped member 520. A configuration similar to that in the above embodiment 1 can be adopted as a configuration of fixing the wire 530 to the sheet-shaped member 520. The wire 530 may be fixed continuously or intermittently to the sheet-shaped member 520. The wire 530 is preferably fixed to the sheet-shaped member 520 in at least portions of the path bending portions Ra, Rb, and Rc described hereinafter. The wire may be fixed continuously or intermittently to the sheet-shaped member also in the embodiment 1 or the like.

More specifically, the sheet-shaped member 520 includes a first sheet-shaped portion 522 and a second sheet-shaped portion 524. Here, the first sheet-shaped portion 522 is formed into a band shape that is bent in a width direction at an intermediate portion in an extension direction. The bent portion in the first sheet-shaped portion 522 is a sheet bending portion 522a. The sheet bending portion 522a is a portion formed to be bent in accordance with an arrangement path of the wire 530 in a vehicle, for example. Here, the sheet bending portion 522a is provided near one end of the first sheet-shaped portion 522. The sheet bending portion 522a is bent to have an obtuse angle, but may also be bent to have an acute angle or a right angle. The second sheet-shaped portion 524 branches to a lateral side of the first sheet-shaped portion 522 at an intermediate portion in the extension direction of the first sheet-shaped portion 522. Here, the second sheet-shaped portion 524 is provided between the sheet bending portion 522a and the other end portion in the first sheet-shaped portion 522. The second sheet-shaped portion 524 is formed into a band shape that is elongated and extends straight. The second sheet-shaped portion 524 branches so as to extend from an intermediate portion in the extension direction of one side portion of the first sheet-shaped portion 522 toward the outside of one side of the first sheet-shaped portion 522. Herein, the second sheet-shaped portion 524 may extend in an orientation that is orthogonal to the first sheet-shaped portion, or may also extend in an oblique direction with respect to the first sheet-shaped portion. There may also be two or more second sheet-shaped portions.

For the sake of convenience, the multiple wires 530 are distinguished as wires 530a, 530b, 530c, 530d, and 530e. Hereinafter, if it is necessary to distinguish the wires 530, distinguishing will be performed using the same reference numerals. The multiple wires 530a, 530b, 530c, and 530d are fixed to the first sheet-shaped portion 522 in an aligned state on one end side of the first sheet-shaped portion 522. The multiple wires 530a, 530b, 530c, and 530d are connected to a connector 540A at one end portion of the first sheet-shaped portion 522. The alignment of the multiple wires 530a, 530b, 530c, and 530d is determined according to positions of connecting the wires to the connector 540A.

Intermediate portions of the wires 530a, 530b, 530c, and 530d are bent in the sheet bending portion 522a which is an intermediate portion of the first sheet-shaped portion 522 in the extension direction. This bending portion is the path bending portion Ra. The path bending portion Ra of the wires 530a, 530b, 530c, and 530d is maintained in a bending state in accordance with the sheet bending portion 522a in the first sheet-shaped portion 522. Path straight portions L are provided on both sides of the path bending portion Ra in the wires 530a, 530b, 530c, and 530d.

The wires 530a and 530b are fixed at an intermediate portion in the extension direction of the first sheet-shaped portion 522 in an aligned state from the path bending portion Ra to the other end of the first sheet-shaped portion 522. The wires 530a and 530b bend toward one side portion of the first sheet-shaped portion 522 and branch with respect to the other wires 530c and 530d in a position where the second sheet-shaped portion 524 is provided, and extend toward the second sheet-shaped portion 524. This bending portion is the path bending portion Rb. The path bending portion Rb of the wires 530c and 530d is maintained in a bending state from the first sheet-shaped portion 522 toward the second sheet-shaped portion 524. The path straight portions L are provided also on both sides of the path bending portion Rb in the wires 530a and 530b.

The wire 530e is fixed to the sheet-shaped member 520 to reach the first sheet-shaped portion 522 from the end portion of the second sheet-shaped portion 524 and reach the other end portion of the first sheet-shaped portion 522. The wire 530e bends in a portion reaching the second sheet-shaped portion 524 and the first sheet-shaped portion 522, and this portion is the path bending portion Rc. The path straight portions L are provided also on both sides of the path bending portion Re in the wire 530e.

The end portions of the wires 530a, 530b, and 530e are connected to the connector 540B at the end portion of the second sheet-shaped portion 524. The end portions of the wires 530c, 530d, and 530e extend toward the other end portion of the first sheet-shaped portion 522, and are connected to the connector 540C. An alignment sequence of the wires 530a, 530b, and 530e and an alignment sequence of the wires 530c, 530d, and 530e are also determined according to positions of connecting the wires to the connector 540B or 540C which is a connection destination.

A folding track 512 is formed on the wiring member 510. As described in the embodiment 1, the folding track 512 is a track along which the wiring member 510 was folded to put it in a compact packaged form for the purpose of packaging, shipping, or the like. Here, the wiring member 510 is folded between one end portion of the first sheet-shaped portion 522 and the sheet bending portion 522a. One folding line (corresponds to the folding track 512 when the wiring member 510 is developed after being folded) is orthogonal to the extension direction of the first sheet-shaped portion 522. More specifically, the wires 530a, 530b, 530c, and 530d are located along the extension direction of the first sheet-shaped portion 522 between one end portion in the first sheet-shaped portion 522 and the sheet bending portion 522a. In this portion, the folding track 512 (a folding location 512A) is orthogonal to the first sheet-shaped portion 522, and is also orthogonal to the path straight portion L in the wire 530a, 530b, 530c and 530d. A method of folding the wiring member 510 is not limited to the above example, and the wiring member 510 may also be folded at a plurality of locations. The wiring member 510 may also be folded along a line that is oblique with respect to the extension direction of the first sheet-shaped portion 522 or the wire 530. The folding track 513 may be provided in a portion where the sheet-shaped portion 520 is not located, that is, for example, portions of the wires 530c, 530d, and 530e extending from the sheet-shaped member 520.

The path bending portions Ra, Rb, and Re described above are located away from the folding track 512. More specifically, the path bending portions Ra, Rb, and Rc are located near the other end of the first sheet-shaped portion 522 with respect to the bending track 512.

The form in which the above-described wiring member 510 is folded, that is, the wiring member 510B in the packaged form is assumed (refer to FIG. 7). In the wiring member 510B in the packaged form, the path bending portions Ra, Rb, and Rc are in the state of being located away from the folding location 512A.

According to the wiring member 510 having such a configuration, a case is suppressed in which the path of the wire 530 are disturbed on the sheet-shaped member 520 or the wire 530 is separated from the sheet-shaped member 520 in the path bending portions Ra, Rb, and Re.

That is to say, assumed is a case where force of raising the wire 530 in a vertical direction acts on the main surface of the sheet-shaped member 520 and a case where force of moving the wire 530 in a lateral direction acts on the main surface of the sheet-shaped member 520. When these two cases are assumed, the wire 530 is detached or separated from the sheet-shaped member 520 more easily in the former case than in the latter case. When the sheet-shaped member 520 are folded at the location where the wire 530 is bended, force is easily applied to a direction in which the wire 530 moves in a lateral direction with respect to the sheet-shaped member 520. In the present wire member 510, the path bending portions Ra, Rb, and Rc are located away from the folding track 512, thus the force of moving the path bending portions Ra, Rb, and Rc in the lateral direction hardly acts thereon. Thus, a case is suppressed in which the path of the wire 530 are disturbed on the sheet-shaped member 520 or the wire 530 is separated from the sheet-shaped member 520 in the path bending portions Ra, Rb, and Re.

All of the plurality of path bending portions Ra, Rb, and Re are preferably located away from the folding track 512, however, this configuration is not necessary. Even if a portion of the plurality of path bending portions is located away from the folding track, the disturbance of the path of the wire and the separation of the wire from the sheet-shaped member is suppressed in the path bending portion.

The wire 530 includes the plurality of path straight portions L, and the path bending portions Ra, Rb, and Rc are provided between the plurality of path straight portions L, thus the folding track 512 can be easily set in at least one of the plurality of path straight portions L.

Since the folding track 512 follows the direction orthogonal to the path straight portion L of the wire 530, there is little likelihood that force of moving the wire 530 acts on the wire 530. Accordingly, a case is suppressed in which the paths of the wires are disturbed on the sheet-shaped member 520 or the wires 530 are separated from the sheet-shaped member 520. All of the folding tracks 512 are preferably orthogonal to the wire 530, however, this configuration is not necessary. Portions of the plurality of folding tracks may be orthogonal to the wire.

As illustrated in FIG. 7, a function effect similar to that described above can be obtained also in the wiring member 510B in which the wiring member 510 described above is folded to be put in a packaged form.

The present wiring member 10 according to the embodiment 1 is also an example of the wiring member 10 including the sheet-shaped member 20 and the linear transmission member (the wire 30 in the present example) fixed on the sheet-shaped member 20, in which the linear transmission member (the wire 30) includes the path bending portion R following the path bent on the sheet-shaped member 20, and the path bending portion R is located away from the folding tracks 12 and 13.

For example, focusing on the wire 30f, the wire 30f includes the two path bending portions R bending at both sides of the intersection location 38a. The wire 30f includes the path bending portion R bending toward one side portion of the first sheet-shaped portion 22 (the end portion of the second sheet-shaped portion 24a) at a location where the second sheet-shaped portion 24a is provided. The wire 30f includes the plurality of path straight portions L extending straight between the path bending portions R described above and an outer side thereof. In other words, the path bending portion R includes the portion provided between the plurality of path straight portions L.

Focusing on the wire 30d, the wire 30d includes the path bending portion R bending toward one side portion of the first sheet-shaped portion 22 (the end portion of the second sheet-shaped portion 24a) at a location where the second sheet-shaped portion 24a is provided. The wire 30d extends straight on both sides of the path bending portion R described above. Thus, the path bending portion R includes the portion provided between the plurality of path straight portions L.

Focusing on the wires 30a and 30b, the wires 30a and 30b include the path bending portion R bending toward the other side portion of the first sheet-shaped portion 22 (the end portion of the second sheet-shaped portion 24b) at a location where the second sheet-shaped portion 24b is provided. The wires 30a and 30b extend straight on both sides of the path bending portion R described above. Thus, the path bending portion R includes the portion provided between the plurality of path straight portions L also with regard to the wires 30a and 30b.

Focusing on the wire 30e, the wire 30e includes the two path bending portions R bending on both sides of the intersection location 39. The wire 30d includes the path straight portion L extending straight between the two bending portions and on both outer sides thereof. The path bending portion R includes the portion provided between the plurality of path straight portions L also with regard to the wire 30e.

The folding track 12 follows a direction orthogonal to the wire 30. Here, the folding track 12 follows a direction orthogonal to the extension direction of the sheet-shaped member 20. The folding track 12 intersects with the path straight portion L following the extension direction of the sheet-shaped member 20. Thus, the folding track 12 is orthogonal to the path straight portion L of the wire 30. Here, the condition where the folding track 12 is orthogonal thereto includes a condition within a range of manufacturing error. For example, the condition where the folding track 12 is orthogonal to the wire 30 may indicate a case where the folding track 12 intersects with the wire 30 at an angle within a range of 90 degrees±10 degrees, and also preferable is a case where the folding track 12 intersects with the wire 30 at an angle within a range of 90 degrees±5 degrees.

Thus, the wiring member 10 according to the embodiment 1 has the function effect similar to that described in the embodiment 2.

[Variation]

Each configuration described in each embodiment and each variation above can be combined as appropriate as long as no discrepancy occurs.

LIST OF REFERENCE NUMERALS

10 Wiring member
10B Wiring member
12 Folding track
12A Folding location
13 Folding track
13A Folding location
20 Sheet-shaped member
22 First sheet-shaped portion
24a Second sheet-shaped portion
24b Second sheet-shaped portion
30 Linear transmission member (wire)
30a, 30b, 30c, 30d, 30e, 30f Wire
38a, 38b, 38c, 38d, 39 Intersection location
40A, 40B, 40C, 40D Connector
110 Wiring member
150 Vehicle fixing portion
210 Wiring member
250A, 250B, 250C, 250D Rigidity providing member
310 Wiring member
510 Wiring member
510B Wiring member
512 Folding track
512A Folding location
513 Folding track
520 Sheet-shaped member
522 First sheet-shaped member
522a Sheet bending portion
524 Second sheet-shaped portion
530 Linear transmission member (wire)
530a, 530b, 530c, 530d Wire
540A, 540B, 540C Connector
L Path straight portion
M Central portion
R, Ra, Rb, Rc Path bending portion
T Other end portion

The invention claimed is:

1. A wiring member comprising:
a sheet-shaped member; and
a plurality of linear transmission members fixed on the sheet-shaped member,
wherein each of the plurality of linear transmission members is individually fixed to the sheet-shaped member by welding,
the plurality of linear transmission members are fixed on the sheet-shaped member such that a portion of the plurality of linear transmission members intersects another said linear transmission member, and
an intersection location of the plurality of linear transmission members is located away from a folding position.

2. The wiring member according to claim 1,
wherein the folding position is a folding track.

3. The wiring member according to claim 1, further comprising
a vehicle fixing portion that is attached to the sheet-shaped member,
wherein the intersection location of the plurality of linear transmission members includes an intersection location located in a region of the sheet-shaped member that corresponds to the vehicle fixing portion.

4. The wiring member according to claim 1,
wherein the intersection location of the plurality of linear transmission members includes an intersection location that is located near an end portion between a central portion in an extension direction of the sheet-shaped member and the end portion.

5. The wiring member according to claim 1,
wherein a rigidity providing member that provides rigidity is provided at the intersection location.

6. A wiring member in a packaged form, comprising:
a sheet-shaped member; and
a plurality of linear transmission members fixed on the sheet-shaped member,
wherein each of the plurality of linear transmission members is individually fixed to the sheet-shaped member by welding,
the plurality of linear transmission members are fixed on the sheet-shaped member such that a portion of the plurality of linear transmission members intersects another said linear transmission member,
the sheet-shaped member and the plurality of linear transmission members are folded to be put in a packaged form, and
an intersection location of the plurality of linear transmission members is located away from a folding location.

7. A wiring member, comprising:
a sheet-shaped member; and
a plurality of linear transmission members fixed on the sheet-shaped member,
wherein each of the plurality of linear transmission members is individually fixed to the sheet-shaped member by welding,
the plurality of linear transmission members include a path bending portion following a bending path on the sheet-shaped member, and
the path bending portion is located away from a folding location.

8. The wiring member according to claim 7,
wherein the folding position is a folding track.

9. The wiring member according to claim 7,
wherein the folding position follows a direction orthogonal to the plurality of linear transmission members.

10. The wiring member according claim 7,
wherein the plurality of linear transmission members include a plurality of path straight portions following a straight path on the sheet-shaped member, and
the path bending portion is provided between the plurality of path straight portions.

11. A wiring member in a packaged form, comprising:
a sheet-shaped member; and
a plurality of linear transmission members fixed on the sheet-shaped member,
wherein each of the plurality of linear transmission members is individually fixed to the sheet-shaped member by welding,
the plurality of linear transmission members include a path bending portion following a bending path on the sheet-shaped member,
the sheet-shaped member and the plurality of linear transmission members are folded to be put in a packaged form, and
the path bending portion is located away from a folding location.

* * * * *